(12) United States Patent
Ito (10) Patent No.: US 8,734,018 B2
(45) Date of Patent: May 27, 2014

(54) FLUID DYNAMIC BEARING DEVICE AND METHOD OF MANUFACTURING THE SAME

(75) Inventor: Kenji Ito, Kuwana (JP)

(73) Assignee: NTN Corporation, Osaka-shi (JP)

( * ) Notice: Subject to any disclaimer, the term of this patent is extended or adjusted under 35 U.S.C. 154(b) by 1213 days.

(21) Appl. No.: 12/294,584

(22) PCT Filed: Feb. 2, 2007

(86) PCT No.: PCT/JP2007/051758
§ 371 (c)(1),
(2), (4) Date: Sep. 25, 2008

(87) PCT Pub. No.: WO2007/122837
PCT Pub. Date: Nov. 1, 2007

(65) Prior Publication Data
US 2009/0232430 A1    Sep. 17, 2009

(30) Foreign Application Priority Data
Mar. 27, 2006 (JP) ................... 2006-086123

(51) Int. Cl.
*F16C 32/06* (2006.01)
*F16C 33/14* (2006.01)
*B21D 53/10* (2006.01)

(52) U.S. Cl.
USPC ...................... 384/114; 29/898.02

(58) Field of Classification Search
USPC ............ 384/100, 107, 276, 297, 299, 606, 384/908–909, 911, 114; 525/133, 151; 264/128; 29/889.02
See application file for complete search history.

(56) References Cited

U.S. PATENT DOCUMENTS

| | | | | |
|---|---|---|---|---|
| 3,352,610 A | * | 11/1967 | Furukawa | 384/97 |
| 4,652,149 A | * | 3/1987 | Nakaoka et al. | 384/100 |
| 4,666,762 A | * | 5/1987 | Yamamoto | 428/216 |
| 5,096,309 A | * | 3/1992 | Nakasugi et al. | 384/909 |
| 5,697,709 A | * | 12/1997 | Mori et al. | 384/297 |
| 5,714,828 A | * | 2/1998 | Ackermann et al. | 310/216.002 |

(Continued)

FOREIGN PATENT DOCUMENTS

| | | | | |
|---|---|---|---|---|
| JP | 57102329 A | * | 6/1982 | B29G 3/00 |
| JP | 58-8605 A | | 1/1983 | |

(Continued)

OTHER PUBLICATIONS

Japanese Office Action dated Jan. 31, 2012, issued in corresponding Japanese Patent Application No. 2006-086123.

(Continued)

*Primary Examiner* — Marcus Charles
(74) *Attorney, Agent, or Firm* — Westerman, Hattori, Daniels & Adrian, LLP (57) ABSTRACT

A fluid dynamic bearing device includes a resin member capable of suppressing the intrusion of a lubricating oil as much as possible even when carbon fibers are compounded. A housing part as the resin member can be obtained by injection-molding a resin composition in which PPS is a base resin, and carbon fibers are compounded. The housing part is in contact with an ester-based lubricating oil filled in the inside of the bearing. The plurality of carbon fibers bound with a binder material not containing an urethane resin are cut and the carbon fibers minced by cutting are compounded into PPS to thereby obtain the above-described resin composition.

3 Claims, 4 Drawing Sheets

(56) References Cited

U.S. PATENT DOCUMENTS

| | | | | |
|---|---|---|---|---|
| 5,767,198 | A | * | 6/1998 | Shimizu et al. ............... 525/133 |
| 6,888,278 | B2 | * | 5/2005 | Nishimura et al. ............ 310/90 |
| 7,127,200 | B2 | * | 10/2006 | Nakamura et al. ............ 399/286 |
| 2004/0017954 | A1 | * | 1/2004 | Komori et al. ................ 384/100 |
| 2004/0113501 | A1 | * | 6/2004 | Tokunaga et al. ............. 384/107 |
| 2005/0163404 | A1 | * | 7/2005 | Shishido et al. .............. 384/100 |
| 2005/0261141 | A1 | * | 11/2005 | Iso et al. ....................... 508/154 |
| 2009/0034888 | A1 | | 2/2009 | Ito et al. |

FOREIGN PATENT DOCUMENTS

| | | | | | |
|---|---|---|---|---|---|
| JP | 60004617 | A | * | 1/1985 | ............. F16C 17/02 |
| JP | 10-37947 | A | | 2/1998 | |
| JP | 11277695 | A | * | 10/1999 | ............. B32B 27/32 |
| JP | 2000-291648 | A | | 10/2000 | |
| JP | 2001336524 | A | * | 12/2001 | ............. F16C 17/22 |
| JP | 2003-172336 | A | | 6/2003 | |
| JP | 2003-314534 | A | | 11/2003 | |
| JP | 2004-197230 | A | | 7/2004 | |
| JP | 2004-244531 | A | | 9/2004 | |
| JP | 2005090754 | A | * | 4/2005 | ............. F16C 17/02 |
| JP | 2005-226193 | A | | 8/2005 | |
| JP | 2005-265119 | A | | 9/2005 | |
| JP | 2006-46431 | A | | 2/2006 | |
| RU | 2081133 | C1 | * | 6/1998 | |
| WO | 2006/013838 | A1 | | 2/2006 | |

OTHER PUBLICATIONS

International Search Report of PCT/JP2007/051758, date of mailing May 15, 2007.

* cited by examiner

|  | Example | | | | | | Comparative Example | | |
| --- | --- | --- | --- | --- | --- | --- | --- | --- | --- |
|  | 1 | 2 | 3 | 4 | 5 | 6 | 1 | 2 | 3 |
| PEEK | 70 | | | | | | | | |
| LCP | | 70 | | | | | | | |
| PPS | | | 70 | 70 | | | 70 | | |
| PBT | | | | | 70 | | | 70 | |
| PPSU | | | | | | 70 | | | 70 |
| CF-Epoxy | | | 25 | | 25 | 25 | | | |
| CF-Nylon | | | | 25 | | | | | |
| CF-Urethane | | | | | | | 25 | 25 | 25 |
| CF-Without Treatment | 25 | 25 | | | | | | | |
| Carbon Black | 5 | 5 | 5 | 5 | 5 | 5 | 5 | 5 | 5 |
| Oil Level Decrease (10 days later) | 0.01 | 0.02 | 0.01 | 0.00 | 0.03 | 0.02 | 0.03 | 0.11 | 0.07 |
| Oil Level Decrease (20 days later) | 0.02 | 0.02 | 0 | 0.01 | 0.03 | 0.03 | 0.12 | 0.23 | 0.12 |

Compouding Ratio : vol%
Oil Level Decrease Amount : mm

FLUID DYNAMIC BEARING DEVICE AND METHOD OF MANUFACTURING THE SAME

CROSS-REFERENCE TO RELATED APPLICATIONS

This application is a U.S. national stage application of International Application No. PCT/JP2007/051758, filed on Feb. 2, 2007, which claims the benefit of priority to Japan Application No. 2006-086123, filed Mar. 27, 2006 the entire contents of which are herein incorporated by reference.

FIELD OF THE INVENTION

The present invention relates to a fluid dynamic bearing device and a manufacturing method of the same.

BACKGROUND OF THE INVENTION

A fluid dynamic bearing device rotatably supports a rotating member by a lubrication film of a fluid created in a bearing clearance between a fixed member and the rotating member. This type of bearing device has characteristics of high-speed rotation, high rotation accuracy, low noise and the like, and is preferably used as a bearing device for a motor mounted on various types of electric equipment including information equipment, more specifically, as a bearing device for a spindle motor of a disk drive in a magnetic disk device such as HDD, an optical disk device such as CD-ROM, CD-R/RW, DVD-ROM/RAM and the like, a magnetic optical disk device such as MD, MO and the like, or as a bearing device for a motor such as a polygon scanner motor of a laser beam printer (LBP), a color wheel motor of a projector and a fan motor.

For example, in a fluid dynamic bearing device incorporated in a spindle motor of a disk drive device such as HDD, there is known one in which both a radial bearing part supporting a shaft member in a radial direction and a thrust bearing part supporting in a thrust direction are made of dynamic pressure bearings. As the radial bearing part in this type of the fluid dynamic bearing device (dynamic pressure bearing device), there is known one in which dynamic pressure grooves as a dynamic pressure generating part that create a dynamic pressure action of a fluid in a bearing clearance are formed, for example, in either of an inner circumferential surface of a bearing sleeve making up the fixed member, and an outer circumferential surface of a shaft member making up the rotating member, and a radial bearing clearance is formed between both the surfaces (e.g., refer to Patent Document 1).

Moreover, since a disk drive device such as HDD is used in a relatively wide temperature range, a lubricant fluid having a low evaporation rate and a low viscosity is preferable for a fluid dynamic bearing device used in a spindle motor of the disk drive device. For example, an ester-based lubricating oil is used (e.g., refer to Patent Document 2).

This type of fluid dynamic bearing device is made up of a plurality of components including, for example, a shaft member, a bearing sleeve, a housing and a seal member, and, it is considered that among these, the components such as the housing and the sealing member are molded using a resin material in view of moldability and low cost (e.g., refer to Patent Documents 3 and 4). Moreover, there is proposed a resin molding in which carbon fibers are compounded into a resin material as a filler for enhancing reinforcement effects and dimensional stability of the resin molding (e.g., Patent Document 5)

[Patent Document 1] Japanese Patent Application Laid-Open No. 2000-291648

[Patent Document 2] Japanese Patent Application Laid-Open No. 2003-172336

[Patent Document 3] Japanese Patent Application Laid-Open No. 2003-314534

[Patent Document 4] Japanese Patent Application Laid-Open No. 2005-265119

[Patent Document 5] Japanese Patent Application Laid-Open No. 2006-46431

DISCLOSURE OF THE INVENTION

Problems to be Solved by the Invention

As the carbon fibers compounded into the resin material, ones each having a fiber length of several millimeters or less are used. These are obtained by cutting carbon fibers in a state where a number of carbon fibers each manufactured normally in several meters are bundled. However, when a cutting width is small (fiber length is small) as described above, cutting in a state where the fiber length is aligned is difficult, and also the carbon fibers after cutting lack handling ability. Therefore, a method is considered in which an appropriate binder material is used to bind and cut the plurality of carbon fibers. In this case, however, since the binder material used for binding the carbon fibers is mixed into the resin composition, in some types of biding materials, there is possibility of having harmful influence on a property of a completed article.

For example, if the used binder material has poor affinity for the carbon fibers and the base resin, adhesion between the base resin and the carbon fibers are low, which may allow a lubricating oil inside of the bearing to intrude into the resin member from the vicinity of the carbon fibers. This could decrease an amount of the lubricating oil inside of the bearing, so that the amount of the lubricating oil capable of circulating inside of the bearing might run short. Particularly, as described above, when as the lubricating oil, one having a high polarity such as an ester-based lubricating oil is used, the type of the binder material should be paid more attention thereto.

As described above, an issue of the present invention is to form a resin member capable of suppressing the intrusion of a lubricating oil as much as possible even when carbon fibers are compounded therein, in this type of fluid dynamic bearing device.

Means for Solving the Problems

In order to solve the above-described problems, the present invention provides a fluid dynamic bearing device including a fixed member, a rotating member, an ester-based lubricating oil, a radial bearing clearance filled with the ester-based lubricating oil, and a radial bearing part that supports the rotating member in a radial direction by an oil film of the ester-based lubricating oil created in the radial bearing clearance, wherein at least any one of the fixed member and the rotating member has a resin member, the fluid dynamic bearing device characterized in that at least a place in the resin member that is in contact with the ester-based lubricating oil is formed of a resin composition that carbon fibers are compounded into, and does not contain an urethane resin as a resin component other than a base resin.

The present invention has been devised as a result of keen examination by the inventors. More specifically, as described above, a defect caused when the resin member was formed of the resin composition into which the carbon fibers cut into short fibers were compounded was investigated by varying the kind of a binder material to be used. As a result, it was found that when the urethane resin is used as the binder material, the above-described defect appears remarkably. From this result, in the present invention, the existence of the binder material and influence on the resin member attributed to the existence, which have not been considered conventionally, are focused on, and further, based on the above-described result, the resin member making up the fixed member or the rotating member is formed of the resin composition in which the carbon fibers are compounded and the urethane resin is not contained as the resin composition other than the base resin. According to the constitution, at least the urethane resin is not used as the binding material for bundling and fixing the carbon fibers when the carbon fibers are cut. Therefore, when the fluid dynamic bearing device into which the above-described resin member is incorporated is used, harmful influence with the urethane resin mixed into the resin composition, for example, as described above, a situation where the lubricating oil intrudes into the resin member, resulting in decrease in lubricating oil amount inside of the bearing can be avoided as much as possible. Accordingly, a sufficient amount of lubricating oil for circular supply can be assured, so that the circular supply of the lubricating oil in the respective bearing clearances can suppress deterioration of the lubricating oil with age as much as possible, and excellent bearing performance can be exerted for a long period of time.

The resin member constituted as described above allows the carbon fibers to be cut, for example, by high-pressure water or the like without using the binder material. However, in view of dimensional stability of the resin member or the like, it is preferable that the carbon fibers contained in the resin composition have as equal a fiber length as possible. Moreover, the improvement in handling ability is important for carrying out the present invention. Based on these standpoints, the present invention provides a manufacturing method of a fluid dynamic bearing device including a fixed member, a rotating member, an ester-based lubricating oil, a radial bearing clearance filled with the ester-based lubricating oil, and a radial bearing part that supports the rotating member in a radial direction by an oil film of the ester-based lubricating oil created in the radial bearing clearance, wherein at least any one of the fixed member and the rotating member has a resin member, the method characterized in that when the resin member is formed of a resin composition into which carbon fibers are compounded, the plurality of carbon fibers bound with a binder material not containing an urethane resin are cut, and the carbon fibers minced by cutting are compounded into a base resin to thereby obtain the resin composition.

In this manner, cutting a number of carbon fibers bound with the binder material not containing the urethane resin can improve the handling ability after cutting while avoiding the above-described harmful influence. Moreover, the resin composition into which the carbon fibers having an equal fiber length are compounded can bring about the resin member that has high oil resistance, and is excellent in strength and dimensional stability.

On the other hand, as a resin appropriate for the binder material other than the urethane resin, for example, an epoxy resin and a nylon resin can be exemplified. With these resins, the intrusion of the lubricating oil into the resin member during use can be surely avoided with the aid of high oil resistance of these resins themselves to the ester-based lubricating oil.

Moreover, as the base resin of the resin composition, any resin can be preferably used as long as it is excellent in resistance (oil resistance) to the ester-based lubricating oil, and, for example, a crystalline resin such as LCP, and PPS, PEEK and PBT can be used, and among these, PPS (polyphenylene sulfide), which is excellent in moldability, can be preferably used.

Effect of the Invention

As described above, according to the present invention, in this type of fluid dynamic bearing apparatus, the resin member capable of suppressing the intrusion of the lubricating oil as much as possible even when the carbon fibers are compounded can be formed.

DESCRIPTION OF SYMBOLS 1, 11, 21 fluid dynamic bearing device
2, 12 shaft part
3 rotating member
7, 17, 27 housing part
7a thrust bearing surface
7a1 dynamic pressure groove
8 sleeve part
9 hub part
10 cap member
R1, R2 radial bearing part
T1, T2, T11, T12 thrust bearing part
S seal space

BEST MODE FOR CARRYING OUT THE INVENTION

Hereinafter, a first embodiment of the present invention is described based on FIGS. 1 to 4. A "up and down" direction in the following description is only defined for easy understanding of position relations between components in the respective figures, and does not specify setting directions, use aspects and the like in the fluid dynamic bearing device. In description of a second embodiment or later, which will be given later, this is applied.

Figure 1:
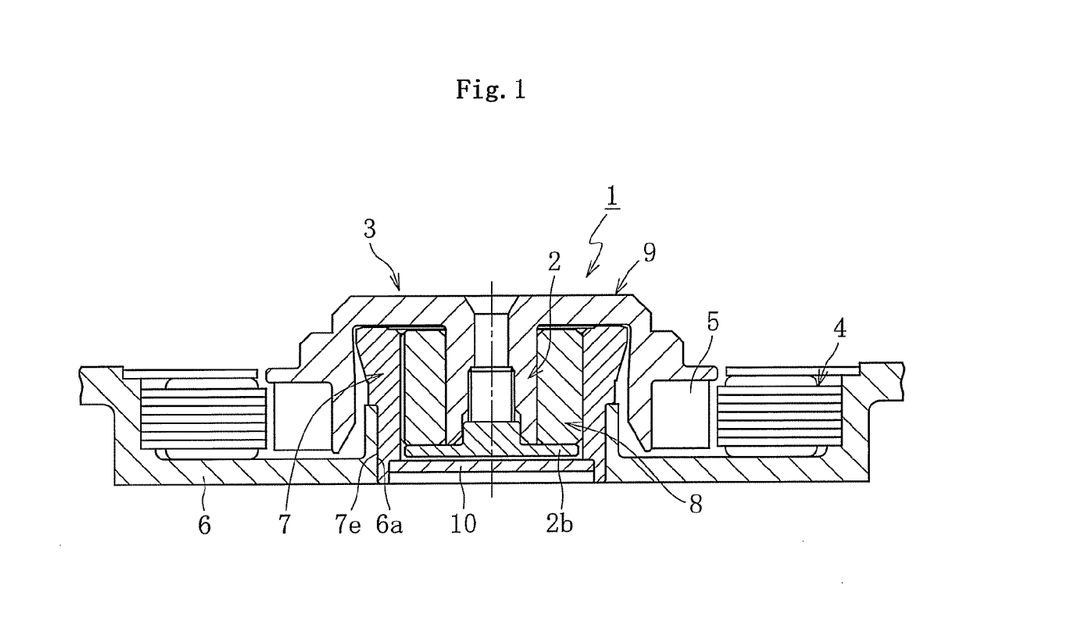
FIG. 1 is a cross-sectional view of a spindle motor in which a fluid dynamic bearing device according to a first embodiment of the present invention is incorporated.

FIG. 1 is a cross-sectional view showing one constitution example of a spindle motor for information equipment in which a fluid dynamic bearing device 1 according to the first embodiment of the present invention is incorporated. This spindle motor is used for a disk drive device such as HDD, and includes the fluid dynamic bearing device 1 that rotatably supports a rotating member 3 having a shaft part 2 in a non-contact state, a stator coil 4 and a rotor magnet 5 opposed to each other with a gap in a radial direction interposed, for example, and a bracket 6. The stator coil 4 is attached on the outer side in a radial direction of the bracket 6, and the rotor magnet 5 is attached in an outer circumference of the rotating member 3. A housing part 7 of the fluid dynamic bearing device 1 is fixed to an inner circumference of the bracket 6. The rotating member 3 hold one or more disk information recording mediums such as (a) magnetic disk(s) (hereinafter, referred to only as disk), the illustration of which is omitted. In the spindle motor constituted in this manner, when the stator coil 4 is energized, electromagnetic force generated between the stator coil 4 and the rotor magnet 5 rotates the rotor magnet 5, and with this, the disk held by the rotating member 3 and the rotating member 3 rotates integrally with the shaft part 2.

Figure 2:
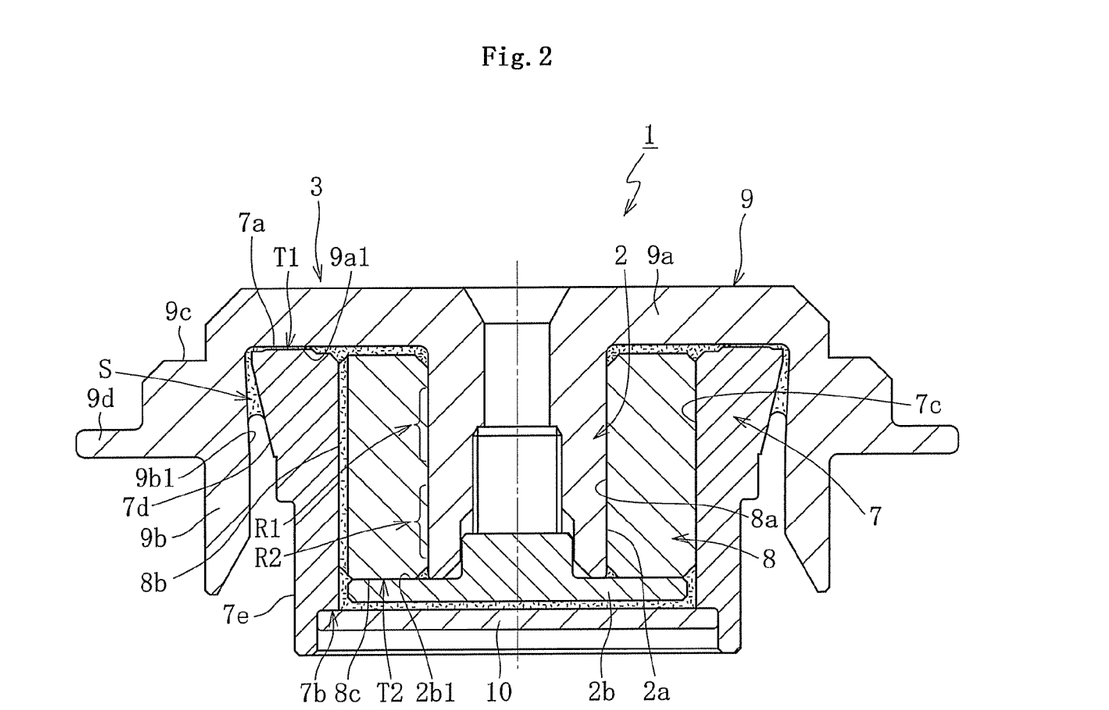
FIG. 2 is a cross-sectional view of the fluid dynamic bearing device according to the first embodiment.

FIG. 2 shows the fluid dynamic bearing device 1. This fluid dynamic bearing device 1 mainly includes the housing part 7, a sleeve part 8 fixed to the housing part 7, and the rotating member 3 rotating relatively to the housing part 7 and the sleeve part 8. In this embodiment, the fixing member is made up of the housing part 7 and the sleeve part 8, and a cap member 10 sealing one end side of the housing part 7 opened at both ends in an axial direction.

The rotating members 3, for example, includes a hub part arranged on the opening side of the housing part 7, the shaft part 2 inserted onto an inner circumferential of the sleeve part 8.

The hub part 9 is formed of a metal material, a resin material or the like, and is made up of a disk part 9*a* covering the opening side (upper side) of the housing part 7, a cylindrical part 9*b* extending downward in the axial direction from an outer circumferential portion of the disk part 9*a*, and a disk loading surface 9*c* and a flange part 9*d* provided in an outer circumference of the cylindrical part 9*b*. The disk not shown is fitted on an outer circumferential of the disk part 9*a* to be placed on the disk loading surface 9*c*. The disk is held by the hub part 9 by appropriate holding means (clamper or the like) not shown.

The shaft part 2 is formed integrally with the hub part in this embodiment, and includes a flange part 2*b* for slipping-off prevention as a separate body in a lower end. The flange part 2*b* is made of a metal, and is fixed to the shaft part 2 by means such as screw joint, for example. In this embodiment, while a case where the shaft part 2 is formed integrally with the hub part 9 is exemplified, it is also possible that the shaft part 2 and the hub part 9 are formed separately, and that these are fixed (assembled) by means such as adhesion and press-fitting.

The sleeve part 8 is, for example, a nonporous body made of a metal, or porous body made of a sintered metal, and is formed into a cylindrical shape. In this embodiment, the sleeve part 8 is a porous body of a sintered metal composed mostly of copper and formed into a cylindrical shape, and is fixed to an inner circumferential surface 7*c* of the housing part 7 by appropriate means such as adhesion (including loose adhesion), press-fitting (including press-fitting adhesion), deposition (including ultrasonic deposition), for example. Obviously, the sleeve part 8 can be also formed of a material other than metal, such as a resin and ceramics.

Figure 3:
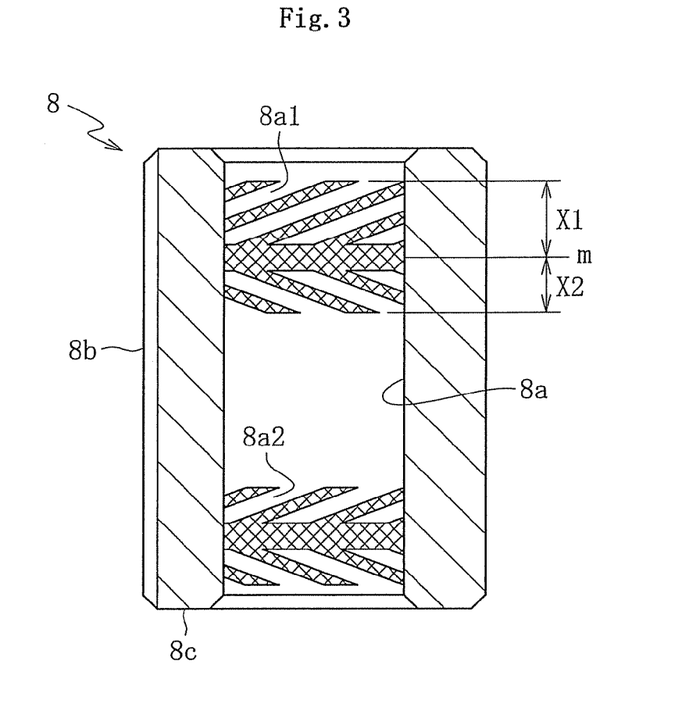
FIG. 3 is a cross-sectional view of a bearing sleeve.

In the whole surface or a partial region of an inner circumferential surface 8*a* of the sleeve part 8, a region where a plurality of dynamic pressure grooves are arrayed is formed as a radial-dynamic-pressure generating part. In this embodiment, for example, as shown in FIG. 3, regions where a plurality of dynamic pressure grooves 8*a*1, 8*a*2 are arrayed in a herringbone shape are formed in two positions apart from each other. In the region where the upper dynamic pressure groove 8*a*1 is formed, the dynamic pressure groove 8*a*1 is formed asymmetrically in the axial direction with respect to an axial center m (axial center of upper and lower inclined grooves), and an axial dimension X1 of an upper region from the axial center m is larger than an axial dimension X2 of a lower region therefrom.

In the whole surface or a partial annular region of a lower end surface 8*c* of the sleeve part 8, a region where a plurality of dynamic pressure grooves are arrayed spirally is formed as a thrust-dynamic-pressure generating part, the illustration of which is omitted. This dynamic-pressure-groove formed region is opposed to an upper end surface 2*b*1 of the flange part 2*b* as a thrust bearing surface, and during rotation of the shaft part 2 (rotating member 3), a thrust bearing clearance of a second thrust bearing part T2 is formed between the upper surface 2*b*1 and the thrust bearing surface (refer to FIG. 2).

Figure 4:
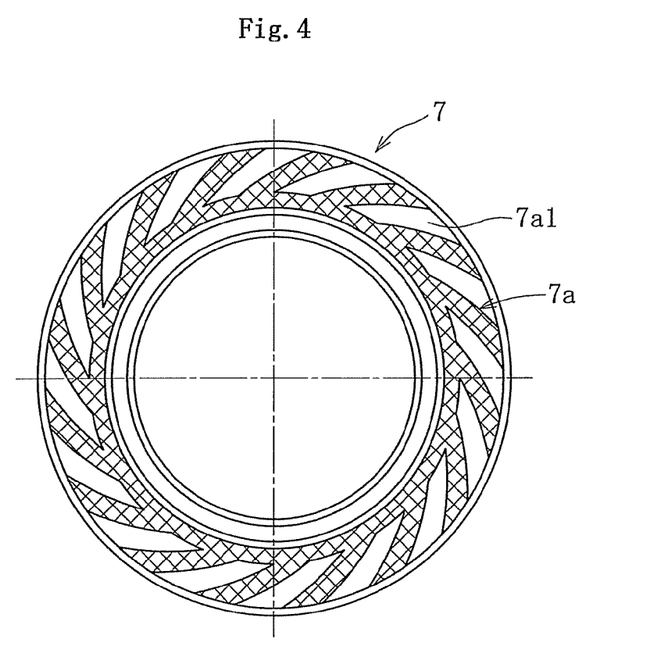
FIG. 4 is an upper end view of a housing.

The housing part 7 is a cylindrical resin molding (resin member). In this embodiment, both the ends in the axial direction of the housing part 7 are opened, and the one end side is sealed by the cap member 10. In the whole surface or a partial annular region of an end surface (upper end surface) on the other end side, a thrust bearing surface 7*a* is provided. In this embodiment, a region where a plurality of dynamic pressure grooves 7*a*1 are arrayed spirally is formed as a thrust-dynamic-pressure generating part in the thrust bearing surface 7*a*, as shown in FIG. 4, for example. This thrust bearing surface 7*a* (dynamic-pressure-grooves 7*a*1 formed region) is opposed to a lower end surface 9*a*1 of the disk part 9*a* of the hub part 9, and during the rotation of the rotating member 3, a thrust bearing clearance of a first thrust bearing part T1, which will be described later, is formed between the lower end surface 9*a*1 and the thrust bearing surface 7*a* (refer to FIG. 2).

The opening part on the other end side of the housing part 7 is sealed by the cap member 10. This cap member 10 is formed by a metal material, a resin material or the like, and is fixed to a stepped part 7*b* provided on the other end inner circumferential side of the housing part 7. Fixing means is not particularly limited, and for example, means such as adhesion (including loose adhesion and press-fitting adhesion), press-fitting, deposition (e.g., ultrasonic deposition), and welding (e.g., laser welding) can be selected appropriately in accordance with combination of the materials, required assembling strength, sealing performance and the like.

The outer circumferential surface 8*b* of the sleeve part 8 is fixed to the inner circumferential surface 7*c* of the housing part 7 by appropriate means such as adhesion (including loose adhesion and press-fitting adhesion), press-fitting, and deposition, for example.

A tapered seal surface 7*d* having a diameter gradually enlarged upward is formed in an outer circumference of the housing part 7. This tapered seal surface 7*d* forms, between the tapered seal surface 7*d* and an inner circumferential surface 9*b*1 of the cylindrical part 9*b*, an annular seal space S in which a radial clearance dimension thereof is gradually reduced from the sealed side (lower) toward the opened side (upper) of the housing part 7. In this seal space S is communicated with the radially outer side of the thrust bearing clearance of the first thrust bearing part T1 during the rotation of the shaft part 2 and the hub part 9.

A bearing internal space (region indicated by a dotted pattern in FIG. 2) including an internal vacancy region of the sleeve part 8 in the fluid dynamic bearing device 1 constituted as described above is filled with a lubricating oil. An oil level of the lubricating oil is constantly maintained within the seal space S. In this embodiment, the outer circumferential surface 2*a* of the shaft part 2 and the inner circumferential surface 8*a* of the sleeve part 8 forming the radial bearing clearance, and the lower end surface 9*a*1 of the hub part 9 and the upper end surface (thrust bearing surface 7*a*) of the housing part 7 and the like forming both the thrust bearing clearances are in contact with the lubricating oil. As the lubricating oil, an ester-based lubricating oil excellent in terms of low evaporation rate and low viscosity is used. Particularly, as in this embodiment, since the lubricating oil provided in the fluid dynamic bearing device (dynamic pressure bearing device) for the disk drive device such as HDD requires a lower evaporation rate and a lower viscosity, the ester-based lubricating oil such as dioctyl sebacate (DOS), and dioctyl azelate (DOZ), for example, is preferably used.

The housing part 7 (resin member) constituted as described above is obtained by injection-molding a resin composition in which a base resin and carbon fibers are compounded, using a die having a shape corresponding to the housing part 7 shown in FIG. 2. In this case, the composition of the carbon fibers into the resin composition is performed as follows.

As the carbon fibers compounded into the resin composition, ones cut in several millimeters or less, preferably about 0.2 to 0.5 mm are used in view of fluidity, moldability and the like inside of the die. In this case, considering handling ability after cutting, for example, a plurality of carbon fibers are cut in a state where they are bundled and fixed using an appropriate binder material. The cut carbon fibers are supplied to the base resin together with the binder material that binds these fibers. Accordingly, the resin composition in which the base resin and the carbon fibers, and the binder material are compounded is obtained. This resin composition is injection-molded as described above to form the housing part 7 as the resin member.

At this time, by using one not containing an urethane resin as the binder material, a situation can be avoided in which the ester-based lubricating oil intrudes into the inside from the vicinity of the carbon fibers exposed on a molded surface of the housing part 7 even when the resin composing the biding material is mixed into the resin composition together with the cut carbon fibers. Therefore, reduction in oil amount of the lubricating oil filled into the fluid dynamic bearing device 1 including, for example, decrease in oil level to be maintained inside of the seal space S and the like, can be suppressed as much as possible, thereby bringing about stable circular supply of the lubricating oil in the respective bearing clearances. Moreover, the assurance of a sufficient amount of lubricating oil for the circular supply can suppress deterioration of the lubricating oil with age, and exert excellent bearing performance for a long period of time. In this case, while the housing part 7 as a completed article contains the base resin and the carbon fibers, it contains no urethane resin as a resin component other than the base resin.

As the binder material, besides being free of urethane, one capable of melting at not higher than a melting temperature of the base resin during injection molding can be used in terms of the dispersibility of the carbon fibers, and as a preferable material, for example, an epoxy resin, a nylon resin and the like can be exemplified. In this case, the housing part 7 as the completed article contains the base resin and the carbon fibers, and contains, for example, the epoxy resin or nylon resin as the binder material in the vicinity of the carbon fibers.

Moreover, in this embodiment, PPS is used for the base resin of the resin composition forming the resin member (housing part 7). Since PPS mainly has excellent properties, such as small outgas yield during solidification, low water absorbability, and high heat resistance, the formation of the housing part 7 using the above-described resin composition can suppress the outgas yield during molding or after molding of the housing part 7, and suppress dimensional change of the housing part 7 due to water absorption. Furthermore, the housing part 7 capable of enduring temperature rise inside of the bearing during driving of the motor can be obtained. Moreover, since PPS can provide high oil resistance to the lubricating oil (low oil absorption property) to the housing part 7, a defect attributed to oil infiltration such as stress crack can be avoided.

Moreover, since PPS is a resin excellent in moldability (e.g., fluidity during molding) as compared with other resins, as in this embodiment, even when portions having a fine and complex shape such as the dynamic pressure grooves 7a1 are provided in a partial surface of the resin member (housing part 7), the portions inside of the die corresponding to the dynamic pressure grooves 7a1 can be filled smoothly.

Moreover, compounding the carbon fibers as a filler brings about reinforcement effects of the housing part 7, and dimensional change of the housing part 7 with temperature change can be suppressed, so that high dimensional stability can be obtained. As a result, the thrust bearing clearance of the first thrust bearing part T1 during use can be controlled with high accuracy. Moreover, compounding the carbon fibers into the base resin can bring about the expression of high conductivity of the carbon fibers, thereby providing sufficient conductivity to the housing part 7. Thereby, the static electricity with which the disk is charged during use can escape to a grounding-side members (bracket 6 and the like) through the rotating member 3 and the housing part 7 (further, may also pass through the sleeve part 8).

For satisfying the above-described required properties, carbon fibers having a tensile strength of 3000 MPa or more are preferable. As ones having high conductivity as well as high strength, for example, carbon fibers of PAN system (polyacrylonitrile) can be exemplified.

Consideration of an aspect ratio of the carbon fibers allows reinforcement effects, dimension stabilization effects, electrostatic removal effects and the like by compounding these carbon fibers into the resin composition to be exerted more remarkably. That is, as a fiber length of the carbon fibers is larger, the reinforcement effects and the electrostatic removal effects increase more, while as a fiber diameter is smaller, abrasion resistance increases more, particularly damage in a sliding counterpart is suppressed. From these view points, more specifically, the aspect ratio of the carbon fibers is preferably set to 6.5 or more. Particularly, as in this embodiment, when the thrust bearing surface 7a in which the dynamic pressure grooves 7a1 are arrayed is provided in the partial surface of the housing part 7, the composition of the carbon fibers each having the above-described aspect ratio can increase the abrasion resistance of the housing part 7.

A filling amount of the carbon fibers as the filler into the base resin is preferably set to 5 to 35 vol %. This is because, for example, if the filling amount is less than 5 vol %, the reinforcement effects, abrasion resistance, and electrostatic removal effects by the filling of the carbon fibers are not sufficiently exerted, while if the filling amount exceeds 35 vol %, it becomes difficult to assure the moldability of the housing part 7.

In this manner, the formation of the housing part 7 using the above-described resin composition can bring about the housing part 7 excellent in terms of high oil resistance and low outgas property, high fluidity, low water absorbability, and high heat resistance during molding, and in addition to these, mechanical strength, impact resistance, moldability, dimensional stability, electrostatic removal property, and abrasion resistance. This can increase durability and reliability of the fluid dynamic bearing device 1 and the disk drive device with this bearing device incorporated.

In the fluid dynamic bearing device 1 constituted as described above, during the rotation of the shaft part 2 (rotating member 3), the regions of the inner circumferential surface 8a of the sleeve part 8 that are the radial bearing surface (dynamic-pressure-grooves 8a1, 8a2 formed regions in the two upper and lower positions) are opposed to the outer circumferential surface 2a of the shaft part 2 with the radial bearing clearance interposed therebetween. With the rotation of the shaft part 2, the lubricating oil in the above-described radial bearing clearance is pushed into the axial center m side of the dynamic pressure grooves 8a1, 8a2, thereby raising pressure. With this dynamic pressure action of the dynamic pressure grooves 8a1, 8a2, a first radial bearing part R1 and a second radial bearing part R2 supporting the shaft part 2 in the radial direction in a non-contact state are made up, respectively.

At the same time, oil films of the lubricating oil are formed by the dynamic pressure action of the dynamic pressure grooves respectively in the thrust bearing clearance between the thrust bearing surface 7a (dynamic-pressure-groove 7a1 formed region) of the housing part 7 and the lower end surface 9a1 of the hub part 9 (disk part 9a) opposed to the above-described thrust bearing surface 7a, and in the thrust bearing clearance between the lower end surface 8c (dynamic-pressure-groove formed region) of the sleeve part 8 and the upper end surface 2b1 of the flange part 2b opposed to the lower end surface 8c. With the pressure of these oil films, the first thrust bearing part T1 and the second thrust bearing part T2 supporting the rotating member 3 in the thrust direction in a non-contact state are made up, respectively.

While as described above, the first embodiment of the present invention is described, the present invention is not limited to this embodiment.

While in the above-described first embodiment, the case where the thrust bearing surface 7a where the plurality of dynamic pressure grooves 7a1 are arrayed is provided in the upper end surface of the housing part 7 (thrust bearing part T1), and the thrust bearing surface where the plurality of dynamic pressure grooves are arrayed is provided in the lower end surface 8c of the sleeve part 8 (thrust bearing part T2), the present invention can be similarly applied to a fluid dynamic bearing device provided with only the thrust bearing part T1. In this case, the shaft part 2 has a straight shape not having the flange part 2b. Accordingly, the housing part 7 can be molded into a bottomed cylindrical shape, which is formed of a resin material integrally with the cap member 10 as a bottom part. Moreover, the shaft part 2 and the hub part 9 can be integrally molded with a metal or resin, and alternatively, the shaft part 2 and the hub part 9 can be formed as separate bodies.

Figure 5:
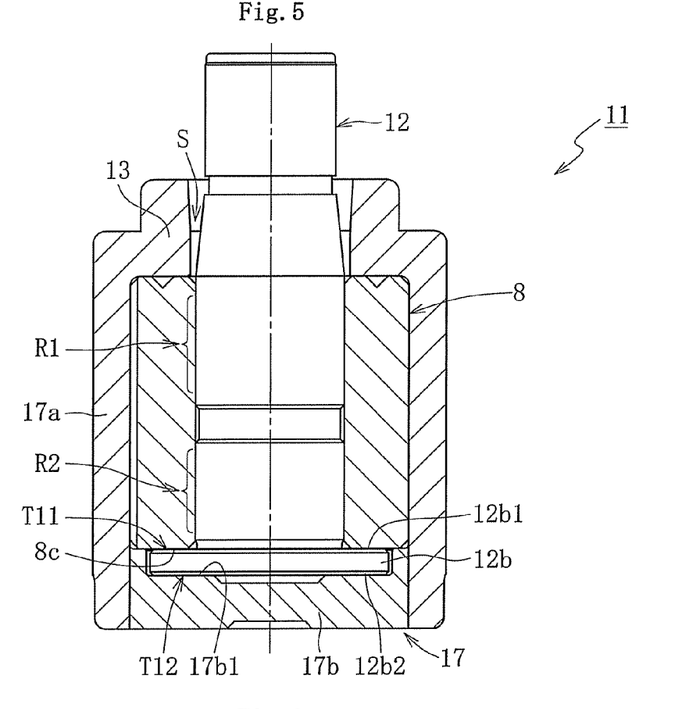
FIG. 5 is a cross-sectional view of a fluid dynamic bearing device according to a second embodiment of the present invention.

FIG. 5 shows a fluid dynamic bearing device 11 according to the second embodiment of the present invention. In this embodiment, a shaft part (rotating member) 12 includes a flange part 12b provided integrally or separately in a lower end thereof. The housing part 17 includes a cylindrical side part 17a, and a bottom part 17b having a separate structure from the side part 17a, and located in a lower end portion of the side part 17a. A seal part 13 protruded to the inner circumferential side is formed integrally with the housing part 17 in an upper end portion of the side part 17a of the housing part 17. In an upper end surface 17b1 of the bottom part 17b of the housing part 17, for example, a region where a plurality of dynamic pressure grooves are arrayed spirally is formed, the illustration of which is omitted, and in the lower end surface 8c of the sleeve part 8, a region where dynamic pressure grooves are arrayed in a similar shape is also formed. A first thrust bearing part T11 is formed between the lower end surface 8c of the sleeve part 8 and an upper end surface 12b1 of the flange part 12b of the shaft part 12, and a second thrust bearing part T12 is formed between the upper end surface 17b1 of the bottom part 17b of the housing part 17 and a lower end surface 12b2 of the flange part 12b. In this embodiment, a fixed member is made up of the housing part 17 integrally provided with the seal member 13, and the sleeve part 8 and the bottom part 17b.

In this embodiment, the side part 17a of the housing part 17 is formed of a resin composition in which carbon fibers cut and minced using a binder material not containing an urethane resin are compounded. Thereby, even when the resin composing the binder material is mixed into the resin composition together with the minced carbon fibers, a situation where an ester-based lubricating oil intrudes inside from the vicinity of the carbon fibers exposed on a molded surface of the housing part 7 can be avoided as much as possible. Therefore, reduction in oil amount of the lubricating oil filled into the fluid dynamic bearing device 11 including, for example, decrease in oil level to be maintained inside of the seal space S and the like can be suppressed as much as possible, thereby bringing about stable circular supply of the lubricating oil in the respective bearing clearances. In this case, while the housing part 17 as a completed article contains the base resin and the carbon fibers, it contains no urethane resin.

Figure 6:
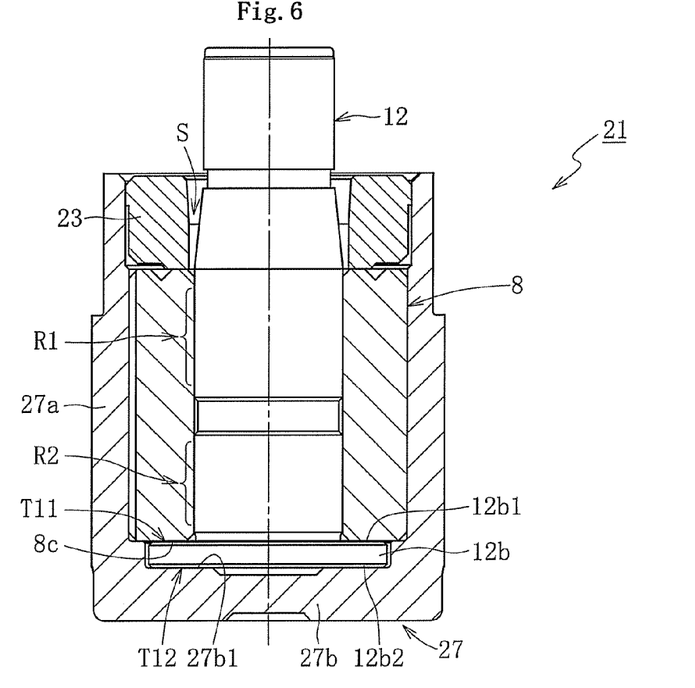
FIG. 6 is a cross-sectional view of a fluid dynamic bearing device according to a third embodiment of the present invention.

FIG. 6 shows a fluid dynamic bearing device 21 according to a third embodiment of the present invention. In this embodiment, a seal part 23 is formed as a separate body from a side part 27a of a housing part 27, and is fixed by means such as adhesion, press-fitting and deposition in an inner circumference of an upper end portion of the housing part 27. A bottom part 27b of the housing part 27 is die-formed of a resin material integrally with the side part 27a of the housing part 27 so that the housing part 27 has a bottomed cylindrical shape. A fixed member is made up of the housing part 27, the sleeve part 8, and the seal part 23. Since constitutions other than this are pursuant to those of the second embodiment, descriptions thereof are omitted.

In this embodiment, the housing part 27 is an integral molding of the side part 27a and the bottom part 27b, and is formed of a resin composition into which carbon fibers cut and minced using a binder material not containing an urethane resin are compounded. Thereby, even when the resin composing the binder material is mixed into the resin composition together with the carbon fibers, a situation where an ester-based lubricating oil intrudes inside from the vicinity of the carbon fibers exposed on a molded surface of the housing part 27 can be avoided as much as possible. Therefore, reduction in oil amount of the lubricating oil filled into the fluid dynamic bearing device 21 including, for example, decrease in oil level to be maintained inside of the seal space S and the like can be suppressed as much as possible, thereby bringing about stable circular supply of the lubricating oil in the respective bearing clearances. In this case, while the housing part 27 as a completed article contains the base resin and the carbon fibers, it contains no urethane resin.

While in the above-described embodiments (first to third embodiments), the case where the housing part 7, and the sleeve part 8 housed in the inner circumference of the housing part 7 are separated is described, these housing part 7 and sleeve part 8 can be also integrated (in the cases of the housing parts 17, 27, this is similarly applied). Moreover, the above-described dynamic pressure generating parts can be provided on the side of the fixed member such as the housing part 7 and the sleeve part 8, and can also be provided on the side of the rotating member 3 opposed to these.

Moreover, while in the above-described embodiments, the cases where the housing parts 7, 17, 27 as resin members are formed of the resin composition in which PPS is the base resin are described, another resin can be used as long as it has high oil resistance (low oil absorption property) to the above-described ester-based lubricating oil. For example, a crystalline resin such as LCP (liquid crystal polymer) and PEEK (polyether ether keton), PA (polyamide), TPI (thermoplastic polyimide), and PBT (polybutylene terephthalate) can keep lower outgas yield and water absorption amount during solidification, and further, since these have high heat resistance, they are preferably used for the resin component of the fluid dynamic bearing apparatus 1. Moreover, it is possible that not only the carbon fibers but also two or more of various fillers such as metal fibers and glass fibers, an inorganic substance such as a whisker, a conductivity additive member such as carbon black, or a solid lubricant such as graphite can be filled in accordance with functions and characteristics required for the component.

Moreover, while in the above-described embodiments, the housing parts 7, 17, 27 as the resin members made of the resin composition which the carbon fibers are compounded into and contains no urethane resin are exemplified, the resin members are not limited to these members. For example, in place of the housing parts 7, 17, 27, any member that has a portion in contact with the ester-based lubricating oil such as the sleeve part 8, the cap member 10, the bottom part 17*b* and the seal parts 13, 23 can be formed of the above-described resin composition (the present invention can be applied). Moreover, not only the fixed member but also the parts making up the rotating member 3, for example, the shaft parts 2, 12, the flange parts 2*b*, 12*b* or the hub part 9 can be the above-described resin molding.

Moreover, while in the above-described embodiments (first to third embodiments), the constitution in which the dynamic pressure action of the lubricating fluid is generated by herringbone or spiral dynamic pressure grooves as the radial bearing parts R1, R2 and the thrust bearing parts T1, T2 is exemplified, the present invention is not limited to this.

For example, as the radial bearing parts R1, R2, although the illustration is omitted, a so-called stepped dynamic pressure generating part in which grooves in the axial direction are formed in a plurality of positions in the circumferential direction, or a so-called multi-arc bearing in which a plurality of circular arc surfaces are arrayed in the circumferential direction, and a wedge-shaped radial clearance (bearing clearance) is formed together with the opposed outer circumferential surface 2*a* of the shaft part 2 (or shaft part 12) may be employed.

Alternatively, the inner circumferential surface 8*a* of the sleeve part 8 as the radial bearing surface is a completely round inner circumferential surface in which neither dynamic pressure grooves nor circular arc surfaces and the like as the dynamic pressure generating part are provided, and a so-called completely round bearing can be constructed by this inner circumferential surface 8*a* and the opposed complete round outer circumferential surface 2*a* of the shaft part 2.

Moreover, one or both of the thrust bearing parts T1, T2, although the illustration is also omitted, can also be constructed by a so-called stepped bearing in which a plurality of dynamic pressure grooves each having a radial groove shape are provided at predetermined intervals in the circumferential direction in a region serving as the thrust bearing surface, a so-called corrugated bearing (an end surface is corrugated to form a harmonic waveform or the like), or the like.

EXAMPLES

In order to verify the effects of the present invention, for resin compositions using different binder materials, or resin compositions into which a plurality of minced carbon fibers were compounded without using any binder material, evaluations in anti-oil absorption property, which is required in the housing for the fluid dynamic bearing device, were performed.

Figure 7:
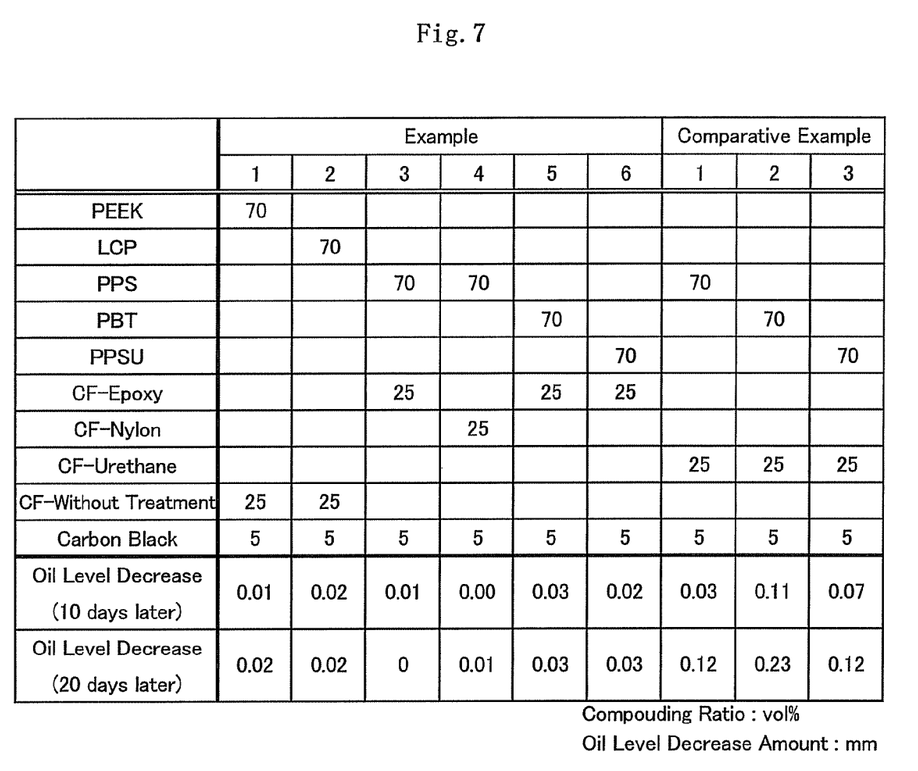
FIG. 7 is a view showing material compositions of Examples and experimental results.

More specifically, the housing part 27 shown in FIG. 6 was formed of a resin composition having each composition shown in FIG. 7, and an oil level decrease amount in the seal space S in the fluid dynamic bearing device 21 with the housing part 27 was measured to evaluate anti-oil absorption property of the resin housing part. If the oil level decrease amount after 10 days have passed since the measurement start time is 0.03 mm or less, and after this (herein, after 20 days have passed), a decrease tendency in oil level is not exhibited, the anti-oil absorption property is satisfied. As the base resin, 5 kinds of thermoplastic resins such as PPS and LCP were used. As the carbon fibers as the filler, ones using an epoxy resin, a nylon resin, and an urethane resin as the binder material, respectively, and ones that were minced without using any binder material were used. Moreover, carbon black was compounded into each of the resin compositions in a predetermined amount as a conductivity additive substance.

Experimental results are shown in FIG. 7. As in Comparative Examples 1 to 3, with the resin compositions into which the carbon fibers using the urethane resin as the binder material were compounded, sufficient oil resistance (anti-oil absorption property) could not be obtained regardless of the kind of the used base resin. In contrast, as in Examples 3 to 6, all of the resin compositions into which the carbon fibers using the resins other than the urethane resin as the binder material were compounded exhibited excellent oil resistance. Moreover, as in Examples 1 and 2, the cases where no binder material was used also exhibited high oil resistance.

The invention claimed is:

1. A fluid dynamic bearing device comprising:
a fixed member;
a rotating member;
an ester-based lubricating oil;
a radial bearing clearance filled with the ester-based lubricating oil; and
a radial bearing part that supports the rotating member in a radial direction by an oil film of the ester-based lubricating oil created in the radial bearing clearance, at least any one of the fixed member and the rotating member having a resin member that is in contact with the ester-based lubricating oil, wherein
the resin member is formed of a resin composition, the resin composition contain a base resin as one of thermoplastic resin elected from the groups that containing PPS, LCP, PEEK, PBT, and PPSU;
carbon fibers; and
a binder material binding the carbon fibers each other in a state where the carbon fibers are bundled,
the carbon fibers are minced by cutting the carbon fibers in a state where the carbon fibers are bound by the bind material,
the binder material is mixed into the resin composition together with the carbon fibers in a state where the carbon fibers are minced,
the binder material is not urethane resin,
the resin member contains an epoxy resin or a nylon resin as the binder material around the carbon fibers in a state where the carbon fibers are minced.

2. The fluid dynamic bearing device according to claim 1, wherein the resin member is formed by injection-molding of the resin composition, the carbon fibers that is set to 6.5 or more as a aspect ratio and is cut in 0.5 mm or less is compounded in the resin composition, the compounding ratio of the carbon fibers is set to 5 vol % to 35 vol %.

3. The fluid dynamic bearing device according to claim 1, wherein the resin composition contains PPS as the base resin.

* * * * *